US007650276B2

(12) United States Patent
O'Neil et al.

(10) Patent No.: US 7,650,276 B2
(45) Date of Patent: Jan. 19, 2010

(54) SYSTEM AND METHOD FOR DYNAMIC DATA BINDING IN DISTRIBUTED APPLICATIONS

(75) Inventors: Edward K. O'Neil, Boulder, CO (US); Daryl B. Olander, Boulder, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 1154 days.

(21) Appl. No.: 10/780,300

(22) Filed: Feb. 17, 2004

(65) Prior Publication Data

US 2004/0250241 A1 Dec. 9, 2004

Related U.S. Application Data

(60) Provisional application No. 60/450,516, filed on Feb. 26, 2003.

(51) Int. Cl.
*G06F 17/20* (2006.01)
(52) U.S. Cl. ............................................. 704/8; 704/3
(58) Field of Classification Search .................... 704/8, 704/3
See application file for complete search history.

(56) References Cited

U.S. PATENT DOCUMENTS

| | | | |
|---|---|---|---|
| 5,321,841 A | 6/1994 | East et al. | 718/107 |
| 5,469,562 A | 11/1995 | Saether | |
| 5,604,860 A | 2/1997 | McLaughlin et al. | |
| 5,630,131 A | 5/1997 | Palevich et al. | |
| 5,748,975 A | 5/1998 | Van De Vanter | 715/531 |
| 5,801,958 A | 9/1998 | Dangelo et al. | 364/489 |
| 5,835,769 A | 11/1998 | Jervis et al. | 717/113 |
| 5,836,014 A | 11/1998 | Faiman | |
| 5,862,327 A | 1/1999 | Kwang | 395/200.33 |
| 5,867,822 A | 2/1999 | Sankar | |
| 5,944,794 A | 8/1999 | Okamoto et al. | |
| 5,950,010 A | 9/1999 | Hesse | 395/712 |
| 5,961,593 A | 10/1999 | Gabber et al. | 709/219 |
| 5,966,535 A | 10/1999 | Benedikt et al. | |
| 6,012,083 A | 1/2000 | Savitzky et al. | |
| 6,016,495 A | 1/2000 | McKeehan et al. | |

(Continued)

FOREIGN PATENT DOCUMENTS

| | | |
|---|---|---|
| CA | 2248634 | 3/2000 |
| WO | WO 99/23558 | 5/1999 |
| WO | 00/29924 | 5/2000 |
| WO | WO 0177822 A2 * | 10/2001 |
| WO | WO 01/90884 A2 | 11/2001 |
| WO | WO 2004/077268 A3 | 9/2004 |

OTHER PUBLICATIONS

Kilgore, R.A., "Multi-language, open-source modeling using the Microsoft architecture", IEEE Proceedings of the 2002 Winter Simulation Conference, Dec. 8-11, 2006, pp. 629-633.

(Continued)

*Primary Examiner*—David R Hudspeth
*Assistant Examiner*—Jakieda R Jackson
(74) *Attorney, Agent, or Firm*—Fliesler Meyer LLP

(57) ABSTRACT

A system and method for dynamically binding a user interface to information, comprising specifying with a first language a first action; specifying with a second language a first data source associated with the first action; rendering output with a third language based at least partially on the first action; wherein the second language is embedded in the first language; and wherein the first action can set or get the first data source.

41 Claims, 7 Drawing Sheets

U.S. PATENT DOCUMENTS

| | | | |
|---|---|---|---|
| 6,018,730 A | 1/2000 | Nichols et al. | |
| 6,023,578 A | 2/2000 | Birsan et al. | |
| 6,023,722 A | 2/2000 | Colyer | 709/201 |
| 6,028,997 A | 2/2000 | Leymann et al. | |
| 6,029,000 A | 2/2000 | Woolsey et al. | |
| 6,044,217 A | 3/2000 | Brealey et al. | 717/107 |
| 6,067,548 A | 5/2000 | Cheng | 707/103 |
| 6,067,623 A | 5/2000 | Blakley et al. | 713/201 |
| 6,070,184 A | 5/2000 | Blount et al. | |
| 6,092,102 A | 7/2000 | Wagner | |
| 6,119,149 A | 9/2000 | Notani | 709/205 |
| 6,141,686 A | 10/2000 | Jackowski | 709/224 |
| 6,141,701 A | 10/2000 | Whitney | |
| 6,148,336 A | 11/2000 | Thomas et al. | |
| 6,185,734 B1 | 2/2001 | Saboff et al. | |
| 6,212,546 B1 | 4/2001 | Starkovich et al. | |
| 6,222,533 B1 | 4/2001 | Notani | 345/329 |
| 6,226,675 B1 | 5/2001 | Meltzer et al. | 709/223 |
| 6,230,287 B1 | 5/2001 | Pinard et al. | 714/31 |
| 6,230,309 B1 | 5/2001 | Turner | 717/1 |
| 6,237,135 B1 | 5/2001 | Timbol | 717/1 |
| 6,243,737 B1 | 6/2001 | Flanagan et al. | |
| 6,282,711 B1 | 8/2001 | Halpern | 717/11 |
| 6,292,932 B1 | 9/2001 | Baisley et al. | |
| 6,311,327 B1 | 10/2001 | O'Brien et al. | |
| 6,324,681 B1 | 11/2001 | Sebesta | 717/1 |
| 6,330,569 B1 | 12/2001 | Baisley et al. | |
| 6,334,114 B1 | 12/2001 | Jacobs et al. | |
| 6,338,064 B1 | 1/2002 | Ault et al. | 707/9 |
| 6,343,265 B1 | 1/2002 | Glebov et al. | |
| 6,349,408 B1 | 2/2002 | Smith | 717/11 |
| 6,353,923 B1 | 3/2002 | Bogle et al. | 717/128 |
| 6,360,358 B1 | 3/2002 | Elsbree et al. | |
| 6,367,068 B1 | 4/2002 | Vaidyanathan et al. | |
| 6,377,939 B1 | 4/2002 | Young | |
| 6,393,605 B1 | 5/2002 | Loomans | 717/121 |
| 6,408,311 B1 | 6/2002 | Baisley et al. | |
| 6,411,698 B1 | 6/2002 | Bauer et al. | |
| 6,445,711 B1 | 9/2002 | Scheel et al. | |
| 6,470,364 B1 | 10/2002 | Prinzing | |
| 6,516,322 B1 | 2/2003 | Meredith | |
| 6,549,949 B1 | 4/2003 | Bowman-Amuah | 709/236 |
| 6,560,769 B1 | 5/2003 | Moore et al. | |
| 6,567,738 B2 | 5/2003 | Gopp et al. | |
| 6,584,454 B1 | 6/2003 | Hummel et al. | |
| 6,594,693 B1 | 7/2003 | Borwankar | |
| 6,594,700 B1 | 7/2003 | Graham et al. | |
| 6,601,113 B1 | 7/2003 | Koistinen et al. | |
| 6,604,198 B1 | 8/2003 | Beckman et al. | 713/167 |
| 6,609,115 B1 | 8/2003 | Mehring et al. | |
| 6,615,258 B1 | 9/2003 | Barry et al. | |
| 6,636,491 B1 | 10/2003 | Kari et al. | |
| 6,637,020 B1 | 10/2003 | Hammond | |
| 6,643,652 B2 | 11/2003 | Helgeson et al. | |
| 6,654,932 B1 | 11/2003 | Bahrs et al. | |
| 6,662,357 B1 | 12/2003 | Bowman-Amuah | |
| 6,678,518 B2 | 1/2004 | Eerola | |
| 6,684,388 B1 | 1/2004 | Gupta et al. | |
| 6,687,702 B2 | 2/2004 | Vaitheeswaran et al. | |
| 6,687,848 B1 | 2/2004 | Najmi | |
| 6,721,740 B1 | 4/2004 | Skinner et al. | |
| 6,721,779 B1 | 4/2004 | Maffeis | |
| 6,732,237 B1 | 5/2004 | Jacobs et al. | |
| 6,748,420 B1 | 6/2004 | Quatrano et al. | |
| 6,754,884 B1 | 6/2004 | Lucas et al. | |
| 6,757,689 B2 | 6/2004 | Battas et al. | |
| 6,789,054 B1 | 9/2004 | Makhlouf | |
| 6,795,967 B1 | 9/2004 | Evans et al. | 719/310 |
| 6,799,718 B2 | 10/2004 | Chan et al. | |
| 6,802,000 B1 | 10/2004 | Greene et al. | 713/168 |
| 6,804,686 B1 | 10/2004 | Stone et al. | |
| 6,823,495 B1 | 11/2004 | Vedula et al. | |
| 6,832,238 B1 | 12/2004 | Sharma et al. | |
| 6,836,883 B1 | 12/2004 | Abrams et al. | |
| 6,847,981 B2 | 1/2005 | Song et al. | |
| 6,850,979 B1 | 2/2005 | Saulpaugh et al. | |
| 6,859,180 B1 | 2/2005 | Rivera | |
| 6,874,143 B1 | 3/2005 | Murray et al. | |
| 6,889,244 B1 | 5/2005 | Gaither et al. | |
| 6,915,519 B2 | 7/2005 | Williamson et al. | |
| 6,918,084 B1 | 7/2005 | Slaughter et al. | |
| 6,922,827 B2 | 7/2005 | Vasilik et al. | |
| 6,950,872 B2 | 9/2005 | Todd, II | |
| 6,959,307 B2 | 10/2005 | Apte | |
| 6,963,914 B1 | 11/2005 | Breitbart et al. | |
| 6,971,096 B1 | 11/2005 | Ankireddipally et al. | |
| 6,976,086 B2 | 12/2005 | Sadeghi et al. | |
| 7,000,219 B2 | 2/2006 | Barrett et al. | |
| 7,017,146 B2 | 3/2006 | Dellarocas et al. | |
| 7,043,722 B2 | 5/2006 | Bau, III | |
| 7,051,072 B2 | 5/2006 | Stewart et al. | |
| 7,051,316 B2 | 5/2006 | Charisius et al. | |
| 7,054,858 B2 | 5/2006 | Sutherland | |
| 7,062,718 B2 | 6/2006 | Kodosky et al. | |
| 7,069,507 B1 | 6/2006 | Alcazar et al. | |
| 7,072,934 B2 | 7/2006 | Helgeson et al. | |
| 7,073,167 B2 | 7/2006 | Iwashita | |
| 7,076,772 B2 | 7/2006 | Zatloukal | |
| 7,089,584 B1 | 8/2006 | Sharma | |
| 7,096,422 B2 | 8/2006 | Rothschiller et al. | |
| 7,107,578 B1 | 9/2006 | Alpern | |
| 7,111,243 B1 | 9/2006 | Ballard et al. | |
| 7,117,504 B2 | 10/2006 | Smith et al. | |
| 7,127,704 B2 | 10/2006 | Van De Vanter et al. | |
| 7,143,186 B2 | 11/2006 | Stewart et al. | |
| 7,146,422 B1 | 12/2006 | Marlatt et al. | |
| 7,155,705 B1 | 12/2006 | Hershberg et al. | |
| 7,184,967 B1 | 2/2007 | Mital et al. | |
| 7,240,331 B2 | 7/2007 | Vion-Dury et al. | |
| 7,260,599 B2 | 8/2007 | Bauch et al. | |
| 7,260,818 B1 | 8/2007 | Iterum et al. | |
| 2002/0004848 A1 | 1/2002 | Sudarshan et al. | |
| 2002/0010781 A1 | 1/2002 | Tuatini | |
| 2002/0010803 A1 | 1/2002 | Oberstein et al. | |
| 2002/0016759 A1 | 2/2002 | Macready et al. | 705/37 |
| 2002/0035604 A1 | 3/2002 | Cohen et al. | |
| 2002/0049788 A1 | 4/2002 | Lipkin et al. | |
| 2002/0073080 A1 | 6/2002 | Lipkin | |
| 2002/0073236 A1 | 6/2002 | Helgeson et al. | |
| 2002/0073396 A1 | 6/2002 | Crupi et al. | |
| 2002/0078365 A1 | 6/2002 | Burnett et al. | 713/200 |
| 2002/0083075 A1 | 6/2002 | Brummel et al. | |
| 2002/0111922 A1 | 8/2002 | Young et al. | |
| 2002/0120685 A1 | 8/2002 | Srivastava et al. | |
| 2002/0143960 A1 | 10/2002 | Goren et al. | |
| 2002/0152106 A1 | 10/2002 | Stoxen et al. | |
| 2002/0161826 A1 | 10/2002 | Arteaga et al. | |
| 2002/0165936 A1 | 11/2002 | Alston et al. | |
| 2002/0174178 A1 | 11/2002 | Stawikowski | |
| 2002/0174241 A1 | 11/2002 | Beged-Dov | |
| 2002/0184610 A1 | 12/2002 | Chong | |
| 2002/0194244 A1 | 12/2002 | Raventos | |
| 2002/0194267 A1 | 12/2002 | Flesner et al. | |
| 2002/0194495 A1 | 12/2002 | Gladstone et al. | |
| 2003/0004746 A1 | 1/2003 | Kheirolomoom et al. | |
| 2003/0005181 A1 | 1/2003 | Bau et al. | |
| 2003/0014439 A1 | 1/2003 | Boughannam | |
| 2003/0018661 A1 | 1/2003 | Darugar | |
| 2003/0018665 A1 | 1/2003 | Dovin et al. | |
| 2003/0018832 A1 | 1/2003 | Amirisetty et al. | |
| 2003/0023957 A1 | 1/2003 | Bau et al. | |
| 2003/0028364 A1 | 2/2003 | Chan et al. | |
| 2003/0028579 A1 | 2/2003 | Kulkarni et al. | |
| 2003/0041198 A1 | 2/2003 | Exton et al. | 710/200 |

| | | | |
|---|---|---|---|
| 2003/0043191 A1 | 3/2003 | Tinsley et al. | |
| 2003/0046266 A1 | 3/2003 | Mullins | |
| 2003/0046591 A1 | 3/2003 | Asghari-Kamrani et al. | |
| 2003/0051066 A1 | 3/2003 | Pace et al. | |
| 2003/0055878 A1 | 3/2003 | Fletcher et al. | |
| 2003/0074217 A1 | 4/2003 | Beisiegel et al. | |
| 2003/0079029 A1 | 4/2003 | Garimella et al. | |
| 2003/0084203 A1 | 5/2003 | Yoshida et al. | |
| 2003/0110117 A1 | 6/2003 | Saidenberg et al. | |
| 2003/0110446 A1 | 6/2003 | Nemer | |
| 2003/0126136 A1 | 7/2003 | Omoigui | |
| 2003/0149791 A1 | 8/2003 | Kane et al. | |
| 2003/0167358 A1 | 9/2003 | Marvin et al. | |
| 2003/0196168 A1 | 10/2003 | Hu | |
| 2004/0019645 A1 | 1/2004 | Goodman et al. | |
| 2004/0040011 A1 | 2/2004 | Bosworth et al. | |
| 2004/0078373 A1 | 4/2004 | Ghoneimy et al. | |
| 2004/0103406 A1 | 5/2004 | Patel | |
| 2004/0133660 A1 | 7/2004 | Junghubert et al. | |
| 2004/0148336 A1 | 7/2004 | Hubbard et al. | |
| 2004/0204976 A1 | 10/2004 | Oyama et al. | |
| 2004/0216086 A1 | 10/2004 | Bau | |
| 2004/0225995 A1 | 11/2004 | Marvin et al. | |
| 2004/0260715 A1 | 12/2004 | Mongeon et al. | |
| 2005/0027845 A1* | 2/2005 | Secor et al. | 709/223 |
| 2005/0050068 A1 | 3/2005 | Vaschillo et al. | |
| 2005/0278585 A1 | 12/2005 | Spencer | |
| 2006/0206856 A1 | 9/2006 | Breeden et al. | |
| 2006/0234678 A1 | 10/2006 | Juitt et al. | |
| 2007/0038500 A1 | 2/2007 | Hammitt et al. | |

OTHER PUBLICATIONS

Chen, Jeff, et al., "eCo Architecture for Electronic Commerce Interoperability", CommerceNet, Inc., 1999-06-29T06:00-4:00, pp. 1-107.

Sosnoski, Dennis, "XML and Java technologies: Data binding, Part 1: Code generation approaches—JAXB and more", Jan. 1, 2003, pp. 1-11.

Liebmann, Erich, et al., "Adaptive Data Dissemination and Caching for Edge Service Architectures built with the J2EE", ACM Symposium on Applied Computing, Nicosia, Cyprus, Mar. 14-17, 2004, pp. 1717-1724.

Embury, S.M., et al., "Assisting the Comprehension of Legacy Transactions," Proceedings of the 8th Working Conference on Reverse Engineering, Oct. 2-5, 2001, pp. 345-354.

Mays, E., et al., "A Persistent Store for Large Shared Knowledge Bases," IEEE Transactions on Knowledge and Data Engineering, vol. 3, No. 1, Mar. 1991, pp. 33-41.

Tang, C., et al., "Integrating Remote Invocation and Distributed Shared State," Proceedings of the 18th International Parallel and Distributed Processing Symposium, IEEE, Apr. 26-30, 2004.

JAVA Debug Interface—definition, retrieved from <URL http://java.sun.com/j2se/1.4.2/docs/guide/jpda/jdi/overview-summary.html on Feb. 21, 2007, pp. 1-3.

Bogunovic, N, "A Programming Model for Composing Data-Flow Collaborative Applications", IEEE Mar. 1999, 7 pages.

Sung, S.Y., et al., "A Multimedia Authoring Tool for the Internet", IEEE 1997, pp. 304-308.

Smith, M., et al., "Marching Towards a Software Reuse Future", ACM Ada Letters, Nov./Dec. 1994, vol. XIV, No. 6, pp. 62-72.

Mohan, C. et al., "ARIES: A Transaction Recovery Method Supporting Fine-Granularity Locking and Partial Rollbacks Using Write-Ahead Logging," ACM Transactions on Database Systems (TODS), vol. 17, Issue 1 (Mar. 1992), pp. 94-162.

BEA, Transforming Data Using Xquery Mapper, 2006, BEA AquaLogic Service Bus 2.0 Documentation, pp. 1-19.

Stylus Studio, Xquery Mapper, 2007, Stylus Studios, pp. 1-6.

Altova, XML-to-XML Mapping, 2007, Altova, pp. 1-3.

Jamper, Jamper-Java XML Mapper, 2007, Sourceforge, pp. 1-4.

Blake, Rule-Driven Coordination Agents: "A Self-Configurable Agent Architecture for Distributed Control", IEEE Mar. 2001, pp. 271-277.

Dahalin et al., Workflow Interoperability Using Extensible Markup Language (XML), IEEE, Jul. 2002, pp. 513-516.

Kunisetty, "Workflow Modeling and Simulation Using an Extensible Object-Oriented Knowledge Based Management System" Citeseer, 1996 pp. 1-60.

Van Der Aaist et al., Verification of XRL: An XML-Based Workflow Lnaguage, IEEE, Jul. 2001, pp. 427-432.

Alonso, G. et al., "Advanced Transaction Models in Workflow Contexts," Feb. 1996, Proceedings of 12th International Conference on Data Engineering, retrieved from http://citeseer.ist.psu.edu/alonso96advanced.html, 8 pages.

Van Der Aalst, W.M.P. et al., "XML Based Schema Definition for Support of Inter-Organizational Workflow," 2000, University of Colorado and University of Eindhoven report, retrieved from http://citeseer.ist.psu.edu/vanderaalst00xml.html, pp. 1-39.

Plaindoux, Didier, "XML Transducers in Java," May 2002, The Eleventh International World Wide Web Conference, retrieved from http://www.2002.org/CDROM/poster/132/index.html, pp. 1-6.

Allamaraju et al., "Professional Java Server Programming J2EE 1.3 Edition," Sep. 2001, WROX, XP002442953, pp. 1009-1057.

Sun Microsystems, Inc., "J2EE Connector Architecture 1.0," Aug. 2001, XP002442954, retrieved from the Internet: http://java.sun.com/j2ee/connector/download.html>, pp. 1-179.

Supplementary European Search Report dated Aug. 8, 2007, for European Patent Application No. EP 02784131.1, 4 pages.

Microsoft, "Microsoft.net Framework," 2001, Microsoft Corporation, pp. 1-50.

Willink, Edward D., "Meta-Compilation for C++," Jan. 2000, University of Surrey, p. 362.

"Introducing Microsoft DotNet", by Christophe Lauer, Jul. 2, 2002, http://webarchive.org/web/20020702162429/http://www.freevbcode.com/ShowCode.as;?ID=2171.

Paul, Laura Gibbons, "RosettaNet: Teaching Business to Work Together", Oct. 1, 1999. http://www.developer.com/sml/article.php/616641.

Mariucci, Marcello. "Enterprise Application Server Development Environments.", Overview. University of Stuttgart. Oct. 10, 2000, p. 1-10.

Sun Microsystems. "IPlanet Application Server 6.0 White Paper.", Technical Reference Guide. May 25, 2000, all, fig. on p. 20.

Roman, Ed and Rickard Oberg, "The Technical Benefits of EJB and J2EE Technologies over COM+ and Windows DNA." Dec. 1999, pp. 3-5, fig. 1.

Hewlett-Packard. "HP Application Server." technical guide version 8.0. 1999-2001, all.

Duvos, Enrique and Azer Bestavros. "An Infrastructure for the Dynamic Distribution of Web Applications and Services." Department of Computer Science, Boston University. Dec. 2000, pp. 4-12.

* cited by examiner

```
    <netui-data                                              binding:repeater
dataSource="{actionForm.purchaseOrder.lineItems}">
        <netui-data binding:repeaterHeader>
            <table>
            <tr><td>Product                              Name</td><td>Unit
Price</td><td>Quantity</td></tr>
        </netui-data binding:repeaterHeader>
        <netui-data binding:repeaterItem>
            <tr>
               <td><netui:label value="{container.item.name}"/></td>
               <td><netui:label
value="{container.item.unitPrice}"/></td>
            <td><netui:label value="{container.item.quantity}"/></td>
            </tr>
        </netui-data binding:repeaterItem>
        <netui-data binding:repeaterFooter>
            </table>
        </netui-data binding:repeaterFooter>
    </netui-data binding:repeater>
```

Fig. 2

```
    <netui-data                                    binding:repeater
dataSource="{actionForm.purchaseOrderArray}">
        <netui-data binding:repeaterHeader>
            <table>
            <tr><td>Customer                       Name</td><td>Customer
Status</td><td>Purchase Total</td></tr>
        </netui-data binding:repeaterHeader>
        <netui-data binding:repeaterItem>
            <tr>
                <td><netui:label value="{container.item.name}"/></td>
                <td><netui:label value="{container.item.status}"/></td>
                <td><netui:label
value="{container.item.purchaseTotal}"/></td>
            </tr>
            <tr>
                <netui-data                       binding:repeater
dataSource="{container.item.lineItems}">
                    ... body content from the above example ...
                </netui-data binding:repeater>
            </tr>
        </netui-data binding:repeaterItem>
        <netui-data binding:repeaterFooter>
            </table>
        </netui-data binding:repeaterFooter>
    </netui-data binding:repeater>
```

Fig. 3

```
<netui:form action="UpdateCart">
    <netui-data                              binding:repeater
dataSource="{actionForm.purchaseOrder.lineItems}">
        <netui-data binding:repeaterHeader>
            <table>
                <tr><td>Product          Name</td><td>Unit
Price</td><td>Quantity</td></tr>
        </netui-data binding:repeaterHeader>
        <netui-data binding:repeaterItem>
            <tr>
               <td><netui:label
value="{container.item.name}"/></td>
               <td><netui:label
value="{container.item.unitPrice}"/></td>
               <td><netui:testBox
dataSource="{container.item.quantity}"/></td>
            </tr>
        </netui-data binding:repeaterItem>
        <netui-data binding:repeaterFooter>
            </table>
        </netui-data binding:repeaterFooter>
    </netui-data binding:repeater>
    <netui:button>Update</netui:button><br/>
</netui:form>
```

Fig. 4

```
<netui-data                                        binding:repeater
dataSource="{pageFlow.cart.lineItemList}">
    <netui-data binding:repeaterHeader>
        <table class="table" border=true>
        <tr        class="tablehead"><td>Name</td><td>Shipped
Date</td><td>Arrival Date (est)</td></tr>
    </netui-data binding:repeaterHeader>
    <netui-data binding:repeaterItem>
        <netui-data  binding:choiceMethod  object="{pageFlow}"
method="getShippingState">
            <netui-data                    binding:methodParameter
value="{container.item.shipState}"/>
        </netui-data binding:choiceMethod>
        <netui-data binding:choice value="inTransit">
            <tr class="row">
                <td><one            embodiment-html:label
value="{container.item.name}"/></td>
                <td><one            embodiment-html:label
value="12/29/2002"/></td>
                <td><one            embodiment-html:label
value="1/8/2003"/></td>
            </tr>
        </netui-data binding:choice>
        <netui-data binding:choice value="arrived">
            <tr class="row">
                <td><one            embodiment-html:label
value="{container.item.name}"/></td>
                <td  colspan=2><one    embodiment-html:label
value="Arrived"/></td>
            </tr>
        </netui-data binding:choice>
        <netui-data binding:choice value="notShipped">
            <tr class="row">
                <td><one            embodiment-html:label
value="{container.item.name}"/></td>
                <td  colspan=2><one    embodiment-html:label
value="Not Yet Shipped"/></td>
            </tr>
        </netui-data binding:choice>
        <netui-data binding:choice default="true">
            <tr class="row">
                <td><one            embodiment-html:label
value="{container.item.name}"/></td>
                <td class="rowerror" colspan=2>
                <one    embodiment-html:label    value="Error;
status unknown. Call customer service at 1-800-555-1212"/>
                </td>
            </tr>
        </netui-data binding:choice>
    </netui-data binding:repeaterItem>
    <netui-data binding:repeaterFooter>
        </table>
    </netui-data binding:repeaterFooter>
</netui-data binding:repeater>
```

Fig. 5

```
<netui-data binding:grid dataSource="{pageFlow.allProducts}"
name="{pageFlow.viewAllGridName}">
        <netui-data binding:pager renderInFooter="true"
renderInHeader="true" action="ViewAll" pageSize="10"/>

<netui-data binding:gridStyle rowClass="rowgrid"
headerClass="tableheadgrid"
                                              tableClass="tablegrid"
alternatingRowClass="alternatingRowgrid"/>

<netui-data binding:columns sortable="true"
filterable="true" sortAction="Sort" filterAction="Filter">
          <netui-data binding:basicColumn title="Product ID"
name="productid"/>
          <netui-data binding:basicColumn title="Product Name"
name="productname"/>
          <netui-data binding:basicColumn title="Unit Price"
name="unitprice"/>
          <netui-data binding:basicColumn title="Category ID"
name="categoryid"/>
          <netui-data binding:anchorColumn action="ViewDetails"
title="Details">
             <one embodiment-html:parameter
name="_autoscope__primaryKey"
value="{container.metadata.uniqueIdentifier}"/>
          </netui-data binding:anchorColumn>
          <netui-data binding:anchorColumn action="Delete"
title="Delete">
             <one embodiment-html:parameter
name="_autoscope__primaryKey"
value="{container.metadata.uniqueIdentifier}"/>
          </netui-data binding:anchorColumn>
        </netui-data binding:columns>

</netui-data binding:grid>
```

Fig. 6

[Pager in Header]
```
<table [class=GridStyle.tableClass]>
    <tr [class=GridStyle.headerClass]>
        <td>column  1:  header</td><td>column  2: header</td><td>column 3: header</td>
    </tr>
    <tr [class=GridStyle.rowClass]>
        <td>column  1:  data  cell</td><td>column  2:  data cell</td><td>column 3: data cell</td>
    </tr>
    <tr [class=GridStyle.alternatingRowClass]>
        <td>column  1:  data  cell</td><td>column  2:  data cell</td><td>column 3: data cell</td>
    </tr>
    <tr [class=GridStyle.rowClass]>
        <td>column  1:  data  cell</td><td>column  2:  data cell</td><td>column 3: data cell</td>
    </tr>
    <tr [class=GridStyle.footerClass]>
        <td>column  1:  footer</td><td>column  2: footer</td><td>column 3: footer</td>
    </tr>
</table>
```
[Pager in Footer]

Fig. 7

SYSTEM AND METHOD FOR DYNAMIC DATA BINDING IN DISTRIBUTED APPLICATIONS

CLAIM OF PRIORITY

This application claims priority from the following application, which is hereby incorporated by reference in its entirety:

U.S. Patent Application No. 60/450,516, SYSTEM AND METHOD FOR DYNAMIC DATA BINDING IN DISTRIBUTED APPLICATIONS, Inventor: Edward K. O'Neil, filed on Feb. 26, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention disclosure generally relates to dynamically binding web pages to server-side data.

BRIEF DESCRIPTION OF THE DRAWINGS

FIG. 2 is an exemplary code segment to display information about the line items of a purchase order in an embodiment.

FIG. 3 is an exemplary code segment illustrating nested Repeaters in an embodiment.

FIG. 4 is an exemplary code segment illustrating the use of read/write JSP tags with a Repeater in an embodiment.

FIG. 5 is an exemplary code segment illustrating use of the Choice tag in an embodiment.

FIG. 6 is an exemplary code segment illustrating tags to render a paged, sortable, and filterable catalog data set in an embodiment.

FIG. 7 illustrates an exemplary structure of tags that the Grid can render in an embodiment.

DETAILED DESCRIPTION

Figure 1:
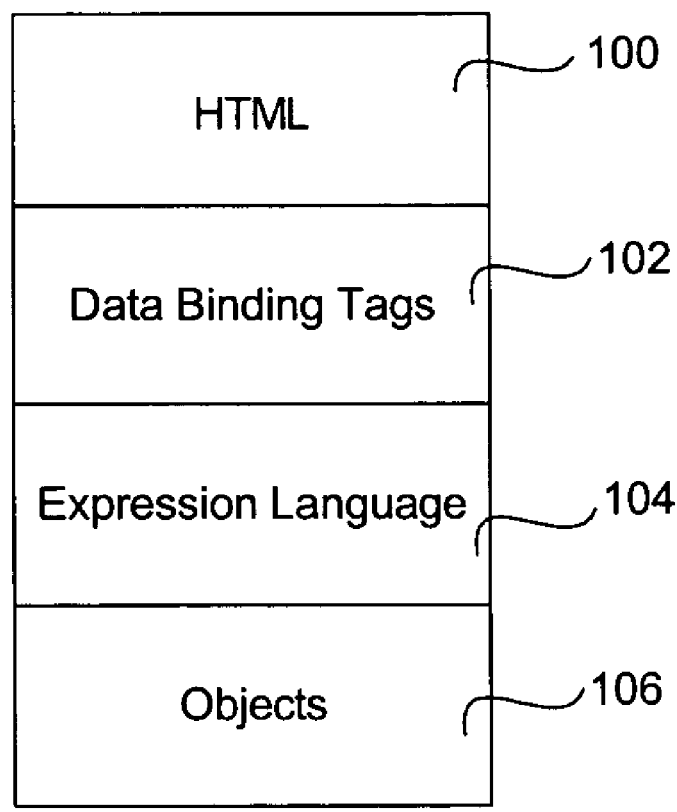
FIG. 1 is an illustration of exemplary logical system components in an embodiment.

Aspects of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Data binding is the process of dynamically binding parts of a user interface (UI) to information. Data binding is important because in order to create useful business applications, a UI needs to present information to a user dynamically. Embodiments include a data binding infrastructure with three components: a set of data binding tags in a first programming language, and an expression language to specify data objects, and a third language to render the specified data objects.

FIG. 1 is an illustration of logical system components in an embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In certain of these embodiments, data binding tags can be custom JSP (JavaServer® Page) tags 102 that have the ability through attributes to reference and display data. By way of a non-limiting example, a text box tag can bind and submit data that a user may edit in a web page. Objects 106 encapsulate information (e.g., a JavaBean®, Java® object or XML document that contains information about a customer such as first name, last name, and shipping address would be a business object). The expression language 104 allows a software developer to set attributes on a JSP tag with an expression that references some field, element or property from an object. The data referenced with the expression may be displayed to the user or may be used to make decisions about what to display to a user. Information can be displayed using HTML (Hypertext Markup Language) 100 or other suitable means for rendering a UI.

In certain of these embodiments, the expression language—XScript—can be an extension to Javascript that adds a native understanding of XML (Extensible Markup Language) processing. XScript can use a subset of this language in its data binding expressions to reference properties on objects. By way of a non-limiting example, the following JSP actions will display a text box that contains an editable field for a user's zip code:

```
<netui:form action="ChangeAddress">
  <netui:textBox
dataSource="{actionForm.shippingAddress.zipCode}"/>
  <netui:button>Submit</netui:button>
<netui:form>
```

The dataSource attribute on the text box tag references a property in the JavaBean containing the shipping address on the current action form; for information on action form objects, please see the page flow specification. In this case, the content of the dataSource attribute is an XScript expression. In one embodiment, an XScript expression is denoted by starting and ending the expression with the "{" and "}" characters respectively. In order to include these characters within an expression, they should be offset with a "\" character. An expression also has different parts, such as its context. In this case, the context of the expression is actionForm. The context defines the object in which the rest of the expression should be evaluated. In one embodiment, there are many different contexts in which to evaluate an expression including:

TABLE 1

Exemplary Contexts in an Embodiment

| CONTEXT NAME | OBJECT THE CONTEXT REFERENCES |
|---|---|
| ActionForm | the action form that is associated with the current form tag. |
| PageFlow | the current pageFlow. |
| GlobalApp | the global app obejct for the webapp. |
| Request | the request's attribute map. |
| Session | the session's attribute map. |
| Application | the servlet context's attribute map. |
| url | the query string for the current request. |
| PageContext | a JSP page's attribute map. |
| Container | the complex data binding tag that is performing iteration over a data set |

The container binding context is described below during the discussion of complex data binding tags. Not all binding contexts may be available at every stage of request processing. By way of a non-limiting example, the pageContext binding context cannot be referenced during the processing of a Page Flow action. Also, while some of these binding contexts are both readable and writable, others are simply readable. Specifically, the actionForm, pageFlow, and globalApp contexts can be written upon a request. The request processing lifecycle is described below.

On a dataSource attribute, an XScript expression can be what is known as an l-value. In one embodiment, an l-value is a programming language expression for something that sits on the left side of an assignment statement. Essentially, it is the part of an assignment that receives the assigned value. An l-value can also be used to reference a property on an object. XScript expressions can reference two parts of a Java object, the object's public fields and its public JavaBean properties. Public fields can be referenced as they are named in the class definition with no changes to the capitalization of the name. The restrictions on referencing public properties are a bit more specific. A public property is defined as a Java method with a public method signature, a non-void return value, zero parameters, and a method name that starts with get. An XScript expression can reference any public method that meets these criteria. The JavaBean property name of a "getter" method can be used in the expression itself. By way of a non-limiting example, a property defined on an action form class with the signature:

public String getShipToZipCode( );

is referenced in an expression as:

{actionForm.shipToZipCode}

The simple naming conventions of a JavaBean property are these:

If the first two letters are upper case, remove "get" from the method name and leave the capitalization alone.

Otherwise, remove "get" and lower case the first letter. The result is the JavaBean property name. A property is read-only unless it has a corresponding JavaBean setter. A JavaBean setter is the inverse of the getter in that the method name can start with set, returns a void type, and has a single argument of the same type as the getter. If such a method exists on a class with the corresponding getter, the property is read/write.

Read/write properties are important in because such a property can be updated by the user from a web page. Generally, only simple types should be updated by the user, though those simple types may be properties of complex objects that may be properties of complex types and so on. Some simple types that the user can update would be String, integer, double, float, and boolean. In evaluating an expression, XScript can resolve properties on JavaBean objects (objects that expose properties as described above) and on Java array, List, and Map types. References to elements in an array or List are made through typical array indexing syntax:

{actionForm.purchaseOrder.lineItem[4].unitPrice}

This expression would reference the unit price of the fifth line item in a customer's purchase order. In order to reference items contained in a Java Map, the syntax is somewhat different:

{actionForm.databaseColumnValues["productname"]}

In this case, the field values for a database record are exposed for data binding through the property databaseColumnValues on an action form. This property returns a Map, and the productname property is extracted from the map.

In addition to supporting binding to JavaBean objects, XScript has the unique ability to bind directly to an XML document. XScript expressions can be written to traverse an XML document's elements and attributes in order to locate sets of or specific matching element(s). Thus, a web page can bind directly to XML with the same syntax that would be used to bind directly to Java. Note, XMLBeans are JavaBean representations of an XML document and provide another way to bind to an XML document in a strongly typed manner.

Business objects are any object in which a developer might store data that is important to the purpose of a web application. Basically, a business object contains data that is presented to and/or collected from the user; this data may originate from a database, XML document, LDAP server, SAP system, or elsewhere. XScript expressions are used to provide access to this object and its properties from the web pages that present data to the user. Virtually any business object that meets the property criteria described above is data-bindable, and developers are free to write arbitrary objects that can be data bound.

JSP tags can be used to present data from a business object to a user. Bridging the gap between the UI component and the business object, the XScript expression language can be used within attribute values on JSP tags to reference properties on a business object. A JSP tag can specifically render and provide the ability to update data from a business object. Attributes on a JSP tag that can contain an expression are referred to as data-bindable. In some cases, an attribute that is data-bindable can contain an XScript expression though in others data-bindable attributes may also contain literal text.

In one embodiment, tags can fall into two categories—HTML and complex data binding. The HTML JSP tags can further be divided into two categories, read-only and read-write. The read-only JSP tags are those that simply read a value from some data source and render it, perhaps with additional formatting, in a web page. Examples of such tags are the label and the content tags where the former can be stylized and the latter simply renders unformatted content. The other half of the HTML JSP tags are those that correspond to elements in an HTML form and the form tag itself. By way of a non-limiting example, the text box, text area, select box, check box, and radio button tags are all examples of read-write JSP tags that render editable elements inside of a form tag. In relation to XScript and a business object, each of these tags can be used to update a single property on a business object. Some of these tags, such as the select box, can read from multiple properties on one or many JavaBean(s). In the case of the select box, it may read its list of options from one property, may read its default selected value from another, and may read/write its currently selected items into yet another property.

In the case of the read-only tags, these tags generally have a value attribute that may contain an XScript expression, but this attribute can sometimes also be literal text. By way of a non-limiting example, consider the following two label tags:

<netui:label value="{actionForm.firstName}"/>
<netui:label value="Jane"/>

In the first case, the label renders the value that is referenced by the expression (actionForm.firstName), but in the latter case the text "Jane" is simply rendered. This is an example of a data-bindable attribute that can accept both literal text and an expression.

Read/write tags have an attribute called dataSource that references the "current" value that the tag should display to the user. The notion of a "current" value can be different depending on the tag. By way of a non-limiting example, on a text box tag the current value is the text to display. On a select box, the "current" value is the set of options that a user has selected, while the list of available options that are displayed is likely databound to a separate property on a business object. Regardless how a tag interprets the dataSource attribute, this attribute is usually required and should be an XScript expression. For Struts compatibility, the dataSource attribute of the read/write tags may take a String that references a property on the current action form.

In one embodiment, if a JSP tag contains an expression, the expression is set as the value of the attribute rather than evaluating the expression first and setting the result as the value of the attribute. During the tag's lifecycle, expressions are evaluated as necessary and the result can be used internally to affect the rendering of the tag. In the case of read/write tags, the expression is also written to the web page in the name attribute of any HTML input tags. When the containing form is submitted to the server, the name attribute contains the XScript expression which is enough information to reference the property to update with the value that was displayed in the form.

The second set of tags are complex data binding tags which are used to render entire data sets to a web page. While the HTML tags generally render single valued objects to the page, e.g., a String text in a text box or a boolean in a check box, complex data binding tags are used to render entire arrays, lists, and maps where each item in the data set is rendered once. Often, the HTML tags described above are nested inside of the complex data binding tags so that meaningful UI is rendered for every item in a data set. Generally, the complex data binding tags can be thought of as tags that create rendering boundaries around the HTML JSP tags. A rendering boundary is established by the opening and closing of a JSP tag; the body contained inside is rendered at a specific time as defined by the container. Thus, the tag defines both a boundary for content and the rules for when that content is rendered. Complex data binding tags are also usually state-machine tags that render their body content several times before completing. While the HTML tags usually render their bodies exactly once, the complex tags render their bodies at least once for every item in a data set and sometimes many more times than that, and each pass through the body of such a tag may be in a different rendering state than the last. Rendering the body of a tag in a stateful way any contained tags that are aware of such stateful rendering to behave differently depending upon the current rendering state. Complex data binding tags are also usually tag sets with a top-level tag that contains other, well-known tags that work together to render a data set. The two tag sets of this type are the Repeater tag set and the Grid tag set.

In one embodiment, the Repeater tag set can be used to render arbitrary repeating mark-up as the tags themselves do not render mark-up internally. Rather, the tags render mark-up that is provided by the user. The tag set consists of one top-level tag, the Repeater. Several well-known child tags can be contained within the Repeater tag that are used to further parameterize the Repeater and to offset additional rendering boundaries such as the header, item, and footer. The repeater tag can be used in one of two ways, unstructured or structured. In unstructured rendering mode, other tags that are part of the Repeater's tag set are not contained within the body, and the body of the tag is rendered once for each item in the data set. By way of a non-limiting example, the following would render each item in a String array on a separate line:

<netui-data      binding:repeater      dataSource=
"{actionForm.stringArray}">
    </:netui:label value="{container.item}"/><br/>
    </netui-data binding:repeater>

For each item in the String array referenced by the expression in the dataSource attribute, the item is rendered on its own line using a Label tag. In order to provide expression based access to the Repeater's current item, a binding context called container can be used within the body of the repeater. This binding context provides contained tags access to the nearest complex data binding tag, which exposes several properties through this binding context:

TABLE 2

Exemplary Container Properties in an Embodiment

| PROPERTY NAME | DESCRIPTION |
|---|---|
| Item | The current item from the data set. |
| Index | The current integer index for the current item in the data set. |
| Container | The nearest containing complex data binding tag. |
| Metadata | An optional attribute that may expose metadata about the data set. |
| DataSource | A reference to the data set that is being rendered; this is usually an XScript expression. |

These properties can be accessed from the container data binding context by using the XScript syntax described above. The label tag in the example above references the current item in the data set with the expression container.item. If the current item in the data set is a JavaBean, the properties of the JavaBean can be accessed by appending them to the end of this expression. Consider a Repeater that is displaying the line items in a purchase order:

<netui-data binding: repeater
    dataSource="{actionForm.purchaseOrder.lineItems}">
    <netui:label value="{container.item.unitPrice}"/><netui:label
    value="{container.item.supplier.supplierId}"/><br/>
    </netui-data binding:repeater>

The unit price and supplier's unique identifier are displayed together on the same line. The Repeater's unstructured mode for rendering its body is convenient, but often when displaying a data set, each item in the data set needs to be rendered with greater structure.

In one embodiment, the Repeater's structured rendering mode can use three tags from its tag set—the Header, Item, and Footer tags. These tags use the state-machine lifecycle of the top-level Repeater tag to render their bodies at a defined stage in the Repeater tag's structured rendering lifecycle. The header and footer tags are rendered exactly once at the start and end of the Repeater's lifecycle while the item tag is rendered once for each item in the data set. These tags used together provide the ability to create structured mark-up such as tables and lists in a web page.

FIG. 2 is an exemplary code segment to display information about the line items of a purchase order in an embodiment. In this example, a table is rendered that contains a header with titles, a row for each item that displays the product name, unit price, and customer's selected quantity, and a footer that closes the table. Here, the header and footer tags are not used for data binding, but in more complex examples, they might display metadata information in the header tag or might sum the price of the cart in the footer tag.

The Repeater tag can also be contained inside of itself. By way of a non-limiting example, two repeaters might be used to render each of the purchase orders that were created during a business day. The outer Repeater would render the purchase order itself while the inner Repeater would render each of the line items in the purchase order.

FIG. 3 is an exemplary code segment illustrating nested Repeaters in an embodiment. In this example, the code from FIG. 2 is wrapped by a Repeater to display each purchase order. The result will be a table where every other row is a table of the line items in the purchase order. Note, however, the difference in the binding expression for the display of the individual line items. In the first example, the expression finds the line items in the actionForm context while in the second example, the line item array is found on the current purchase order using the Repeater's container.item syntax.

In addition to displaying read-only data as in these examples, the Repeater tag set can also contain read/write JSP tags including form elements such as text box, select, and check box. When using these tags in the body of a repeater that is contained within a Form tag, the result is a web page that allows editing the items in a data set.

FIG. 4 is an exemplary code segment illustrating the use of read/write JSP tags with a Repeater in an embodiment. This code allows a customer to examine their cart and edit the quantity of each item therein before placing an order. The quantity for each item is displayed in a text box that lets the user edit the value.

In one embodiment, when a form is submitted, each text box in the form submits its name and a possibly updated value to the Page Flow runtime. Because the text box is an editable field and its expression uses the container data binding context, its name is rewritten so that an absolute path to a JavaBean property is rendered into the web page for the text box's name attribute. By way of a non-limiting example, the text box for the third item above would render the expression:

{actionForm.purchaseOrder.lineItems[3].quantity}

The array index into the line item array is different for each row, and each row in the table contains a reference to a unique property in the action form object. In one embodiment, name rewriting works by examining the expression and qualifying the container contexts using the dataSource attribute on the nearest Repeater. In the case of nesting, if the dataSource of the nearest Repeater also references a container binding context, rewriting occurs at the next level of Repeaters.

In one embodiment, the Repeater provides more advanced features for the customization of how the items in the data set are rendered—padding and choice. Padding can be used in the repeater to create a regular display of an irregular data set as the Repeater's rendering of its Item tag can be truncated or padded using the Pad tag. The Pad tag provides attributes such as maxRepeat, minRepeat, and padText control rendering. MaxRepeat can be used to control the maximum number of that the Item should render while minRepeat controls the minimum number of times that the Item should be rendered. The padText can be used if the minRepeat value is not met with the size of the data set; then, the padText is rendered to bring the number of rendered items up to the value of minRepeat. The Pad tag is a peer to the Header, Item, and Footer tags and is useful when several repeaters need to appear to be the same size even if the sizes of their data sets are different.

The choice feature can be used to select the UI to render for each item in a data set; this consists of two parts—a choice method and the choice options. The choice method can be used to decide which choice to render for the current item, and the choice options are named options that define the options for rendering the current item. The tags used to make the choice and define the choices are the ChoiceMethod and Choice tags, respectively. Both can be contained by the Item tag.

In one embodiment, the ChoiceMethod tag can appear once and the Choice tag can appear any number of times where each Choice tag defines a different UI to render for each item. The ChoiceMethod tag invokes a reflective call on an object, specified by an XScript expression, and can pass any data to the call including data from the current item in the Repeater. The result of invoking a ChoiceMethod tag is a String that is matched against the value attribute of each Choice tag. If a match is found, the body of the matching Choice tag is rendered for the current item; if no match is found but a Choice is marked as default, the default Choice is rendered.

FIG. 5 is an exemplary code segment illustrating use of the Choice tag in an embodiment. This example can be used to render a different UI based on the shipping status of each item in a purchase order. The ChoiceMethod tag invokes a method on the current Page Flow to decide which Choice to render given the value of the shipState property of the Repeater's current item. If the return value is in Transit, arrived, or notShipped the associated Choice tags are rendered. Otherwise, the last, default Choice is rendered.

In one embodiment, the Grid tag set is similar to the Repeater tag set in that it renders a data set; however, the Grid tag set expects regular data and takes a column-oriented approach to rendering the data set. Grids can also provide advanced functionality including the ability to sort, filter, and page through a data set. While the Repeater exposes the current data item directly to its child tags, the Grid requires that a particular interface be implemented overtop each type of data set that may be rendered. In order to expose features such as filtering, the Grid requires metadata about the data set that is not exposed through the properties on the data set object.

In one embodiment, the dataSource attribute on the Grid tag requires that referenced data set be supported by an implementation of a DataContext interface. The DataContext interface exposes the data in the items of the result set, an iteration mechanism for iterating over this data, and metadata about the underlying data set including type and unique identifier information. In one embodiment, the DataContext interface can support rendering a javax.sql.RowSet with the Grid tag set. The RowSet interface is a disconnected view of database data that is created from the more common java.sql.ResultSet, which is usually returned when executing a query on a database through JDBC (Java Database Connectivity). The RowSet extracts the data from the Result and stores it internally; the DataContext interface is aware of how to extract data and metadata from the RowSet interface.

The Grid takes a column-centric approach to rendering data. In addition, the Grid tag renders its own table, rows, and cells that wrap records contained within the data set. While the Repeater can render each row in a data set with a different UI, the Grid renders each row in the data set using the same UI. The UI for the entire grid, including the header, rows, and footer can be defined with a set of GridColumn JSP tags. GridColumn tags are used to output the cells contained within a single, vertical column in the HTML table that the Grid renders. Each GridColumn tag can render a column specific header that might be plain text or might include links to sort or filter a particular column. Generally, a GridColumn tag references the data that it will render by name. The DataContext interface exposes methods that allow the Grid to extract data from the current item in the DataContext by name. For the RowSet implementation of the DataContext, this name can be the column name from the database table that contained the RowSet's data.

In one embodiment, a BasicColumn can be used to simply render data from the data set and is the most commonly used column type. An AnchorColumn optionally references a specific cell in the current data item and can be used to render a link that to another page or to an action in a Page Flow. If the name of a data item is not specified on the AnchorColumn, its title is rendered in every cell with the appropriate link. An ExpressionColumn allows a developer to provide an expression that will be evaluated to customize the appearance of a column. In the Basic and Anchor Column tags, the data that is present in the data set is rendered directly and no visual customization, except through the use of Formatter tags, is allowed as the tags never expose the data to the user as in the Repeater.

In one embodiment, the Basic and Anchor Column tags extend from the SortFilterColumn, which can render links in the header of the Grid that, if clicked, will sort the column or allow the user to specify a filter for the column. The process of rendering and maintaining sorts and filters can be done through query parameters on the URL; a separate class called the SortFilterService can be used to provide an API over the sorts, filters, and paging characteristics of the grid. By way of a non-limiting example, in order to render a link to change the page of the grid, all of the current sorts and filters can be maintained on this link. The SortFilterService exposes an API that allows a column implementation to ask for a link that will maintain the sorts and filters but change to a different page. Similarly, the SortFilterService provides methods to change the current sort on the URL.

In one embodiment, the link rendered for a filter is Javascript that pops-up a filter window that allows the user of a web page to constrain the values on a column. The Grid supports two levels of filters and a filter on each column that is filterable. The process of actually sorting or filtering the data is done on a server, however. On the server, a SortFilterService can be used to create a DatabaseFilter object that is aware of the sorts and filters in the URL and can generate the appropriate SQL for the ORDER BY and WHERE clauses of the SQL (Structured Query Language) statement. The DatabaseFilter object can be used in conjunction with a database control to parameterize a query to the database and return a RowSet that reflects the constraints specified in the URL. Any other capabilities of filtering, including clearing the filters of a column and clearing all the filters of the grid, are performed by setting the URL of a Grid's window to a value that simply does not contain these parameters in the URL.

In one embodiment, the Grid's tag set includes a Columns tag, Pager tag, and a GridStyle tag. The Columns tag can be used to contain all of the columns that will be rendered for the grid and acts as a rendering boundary for these tags. In addition, the global capabilities for sorts and filters can be set on the Columns tag for the contained grid column tags that can be sorted and filtered. The GridStyle tag can be used to set the table, row, alternating row, header, and footer style classes that are rendered in the Grid. If an alternating row style is specified, this style will be applied to all of the odd numbered rows in a Grid page. The Pager tag can be used to parameterize the Pager that will be rendered by the grid; the pager can be used to display a reasonable number of rows on a particular page and allow the user of a web page to navigate through pages by using the common "Previous" and "Next" idiom. The Pager tag has boolean properties that allow a Grid to be rendered before and/or after the HTML table that the Grid renders to display the data. FIG. 6 is an exemplary code segment illustrating tags to render a paged, sortable, and filterable catalog data set in an embodiment.

The Grid tag set renders similarly to the Repeater because it uses a state machine and cooperation with the Grid tag set's tags to perform particular actions during specific render states. The Grid lifecycle is somewhat more complicated because the single, contained iteration boundary, the Columns tag, renders during multiple states and performs a different action for each one. FIG. 7 illustrates the structure of the tags that the Grid can render in an embodiment.

In one embodiment, the Grid passes through the HEAD_PAGER, HEADER, ROWS, FOOTER, and FOOT_PAGER in the process of rendering a Grid into the structure above. The Columns tag renders its body once in the HEADER state, once for each item in the page in the ROWS state, and once for each item in the FOOTER state, and each of the grid column tags contained within the Columns tags renders once for each one of these states. The GridColumns tag defines a rendering method for each of the HEADER, ROWS, and FOOTER states and invokes the appropriate method for the current state:

protected abstract String renderHeader( );
protected abstract String renderCell( );
protected abstract String renderFooter( );

A GridColumn class can provide a plug-in point for developers who need to write their own column implementations. All of the data in each column is rendered through one of these methods depending on the lifecycle state of the column.

The tag set provides a set of abstract base tags that can be extended to provide a plug-in point for developers that need to write tags that can participate in the Page Flow runtime and in data binding. In one embodiment, read/write tags render an HTML <input type=" " . . . > tag to the web page, and these tags contain a name attribute that is sent in the request when the containing form is submitted back to the server. The name attribute of the tag is present in the request object's parameter map at the server; the value associated with each name key is the value that was submitted by each of the input tags. If the value of a form element was edited, this value will contain the edit. In addition to using the XScript expression in the dataSource attribute for reading data, this expression is also used to update the property referenced by the expression. The value of the data source attribute is written into the name attribute of the HTML input tag. Then, when the form is submitted, the expressions are submitted with the current value of the associated form element.

By way of a non-limiting example, if a text box is rendered with the expression "{actionForm.firstName}" and the user types "Jane", the value submitted to the server for this text box is the pair "{actionForm.firstName} " and "Jane". If the form containing the JSP tags is submitted to a Page Flow action, the Page Flow runtime starts processing the request. At an early stage in this processing lifecycle, the values in the request are used to update the underlying business objects. This can be performed by iterating over each of the "key" values that were submitted in the request. In this example, the XScript expression would be the key for the value "Jane". If the key is an XScript expression, the property referenced by the expression is updated to equal the new value. Because a request represents all submitted values as Strings, XScript can infer the type of the property that is being set and converts the value of each XScript expression key to the target type and then sets this value on the property referenced by the expression. Once all of the XScript expressions have been updated, all Struts properties are updated using the Struts request processing mechanism.

In one embodiment, data binding contexts such as actionForm and container are defined by the ContextResolver interface and with a context name. When an expression is parsed, its context can be used to find an associated ContextResolver. If a matching ContextResolver is found the ContextResolver is passed a Map of available objects and is expected to create an XScript Scriptable object that represents the given context.

The next identifier in the context is evaluated against this Scriptable object and expression evaluation continues until the end of the expression.

In one embodiment, ContextResolvers can have a unique name in the global namespace of available contexts. A ContextResolver implementation can be marked as request read-only or request read/write; by default, all context resolvers are request read-only though some contexts such as the actionForm and the pageFlow are read/write. A request read-only context is a context that can not be updated when data submitted from a web page form is being processed. Allowing all contexts to be updateable would create a security vulnerability as read/write contexts could be referenced with large amounts of data that could be used to perform a denial of service attack on a server. In the Page Flow runtime, however, most expression contexts such as the request and the session are updatable by invoking the expression evaluation engine directly. The contexts that are available in the server can be specified through a context.properties file that is parsed when the first expression is evaluated. This file establishes the context name to ContextResolver implementation mappings.

In one embodiment, when a form is submitted from a web page, the (key, value) pairs that are submitted to the server from the editable form components are represented entirely as String data. If the key of such a pair is an XScript expression, the expression may reference a property on a business object of any type. Thus, type conversion can be used to change the String value into the type that the property's setter expects. Type conversion can handle all of the basic primitive, primitive wrapper, String, and some database types including BigDecimal and Date. Additional types or overrides of the default converter implementations can be plugged-in by a web application developer by creating or editing a Java property file in the webapp's WEB-INF directory. When the web application is deployed by the server, this property file is parsed and the specified type converters are loaded into the TypeUtils class. XScript performs type inferencing on the object referenced by the submitted expression, the type of the referenced property is discovered, and the key's associated value and this type are passed to the type converter. The return value is an Object that can be reflectively applied to the setter for the property.

In one embodiment, the DataAccessProvider interface is implemented by the Repeater tag and can be used to provide tags in the Repeater's body access to properties on the container binding context. Repeater nesting and referencing the properties of ancestral Repeater's is possible because of the Repeater's implementation of this interface; the context that evaluates the container expressions is aware of the DataAccessProvider interface and can navigate up the DataAccessProvider/Repeater hierarchy in order to resolve properties on parent Repeater tags.

Rewriting the dataSource attributes of read/write tags contained within a Repeater is can be a non-trivial process. Any references to the container binding context can be resolved into fully qualified XScript expressions that reference a specific property. After rewriting such an expression, the result should be usable outside of a Repeater to bind directly to the property referenced from the container binding expression. Expression rewriting is complicated by the fact that Repeater tags can be deeply nested and that tags inside of a repeater can refer to properties on the parent using the syntax container.container and the Repeater's parent's current data item is available with the binding expression container.container.item.

Name rewriting can start with the expression to rewrite, for example container.item.firstName. If the dataSource of the container is a real reference as actionForm.customer, then it is substituted to create the indexed expression actionForm.customer[index].firstName where the index is the current index into the data set. If instead the container's reference contains a reference to another container, then the expression can be rewritten using the parent's parent's dataSource attribute, and so on. Additionally, if an expression starts with container.container.item.firstName, the rewriting can start with Repeater's parent's dataSource attribute.

In one embodiment, a Repeater's rendering lifecycle can include several stages: HEADER, ITEM, and FOOTER. As the Repeater renders its body, it walks these stages in order and renders in HEADER state once, ITEM state once for each item in the data set, and FOOTER state once at the end of the Repeater lifecycle. Within ITEM state, the Item tag makes two passes through its body once in each of the CHOOSE and the RENDER states. In CHOOSE state, the ChoiceMethod tag executes and any Choice tags register their value and default attributes. At the end of the CHOOSE state, the Item tag can decide which Choice tag to render as it knows the values of all of the choice tags. In RENDER state, the Choice tags each ask the Item for permission to render, and if granted, a Choice tag will render its body which can databind to the Repeater's current item. If no ChoiceMethod or Choice tags are present, the Item renders its body on the first pass and the render state of the Item tag is ignored by the contained tags.

One embodiment may be implemented using a conventional general purpose or a specialized digital computer or microprocessor(s) programmed according to the teachings of the present disclosure, as will be, apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention have been provided for the purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for dynamically binding a user interface to information stored in a data source, comprising:
    displaying a user interface, wherein the user interface is operable to
        display information in a web page, wherein the information is stored in a first data source on a business object,
        collect additional information from a user, and
        store the additional information in the first data source on the business object;
    providing a data binding tag that defines
        a rendering boundary within the web page for rendering the information, and
        rules to be applied when the information is rendered, wherein the data binding tag includes a plurality of attributes;
    specifying, by the data binding tag, a first action which includes reading or updating the information stored in the first data source, wherein at least one of the attributes is associated with the first action;
    specifying the first data source associated with the first action using a script; and
    rendering each item in the first data source on the web page in the user interface with a markup language according to the boundary and the rules defined by the data binding tag and based on the first action, including evaluation of the script.

2. The method of claim 1 wherein:
the data binding tag allows for the specification of JavaServer Page action elements.

3. The method of claim 1 wherein:
the scripting language is based on the Javascript language.

4. The method of claim 1 wherein:
the first data source identifies one of: 1) an object field; 2) an object property; and 3) an Extensible Markup Language document element.

5. The method of claim 4 wherein:
an object is a JavaBean.

6. The method of claim 1 wherein:
the first data source is one of: 1) an array; 2) a list; 3) a map.

7. The method of claim 1 wherein:
the markup language can include at least one of: Hypertext Markup Language (HTML), Dynamic HTML, Extensible HTML, and Extensible Markup Language.

8. The method of claim 1 wherein:
the first action can have at least one child action.

9. The method of claim 8 wherein:
the at least one child action can refer to the first data source with a context defined by the first action.

10. The method of claim 8 wherein:
the at least one child action can perform at least one of the following actions on the first data source: 1) set; 2) get; 3) sort; and 4) filter.

11. The method of claim 8, further comprising:
rendering a list or a table based on the first data source.

12. The method of claim 1 wherein the additional information includes an expression that is stored in the data source and wherein the expression is evaluated to produce a value when the additional information is rendered.

13. The method of claim 1 wherein the data binding tag includes a repeater element wherein data associated with the repeater element is rendered multiple times according to the repeater element's lifecycle.

14. The method of claim 13 wherein the repeater's lifecycle includes a plurality of states including an item state during which the repeater element determines, for each of the data associated with the repeater element, a user interface with which to render the data and permission to render the data in the user interface.

15. A machine readable medium having instructions stored thereon that when executed by a processor cause a system to:
    display a user interface, wherein the user interface is operable to
        display information in a web page, wherein the information is stored in a data source on a business object,
        collect additional information from a user, and store the additional information in the data source on the business object;
    provide a data binding tag that defines
        a rendering boundary within the web page for rendering the information, and
        rules to be applied when the information is rendered, wherein the data binding tag includes a plurality of attributes;
    specify, by the data binding tag, a first action which includes reading or updating the information stored in the data source, wherein at least one of the attributes is associated with the first action;
    specify, using a script, at least one attribute on the data binding tag to reference the data source associated with the first action; and
    render each item in the first data source on the web page in the user interface with a markup language according to the boundary and the rules defined by the data binding tag and based at least partially on the first action, including evaluation of the script.

16. The machine readable medium of claim 15 wherein:
the data binding tag allows for the specification of JavaServer Page action elements.

17. The machine readable medium of claim 15 wherein:
the scripting language is based on the Javascript language.

18. The machine readable medium of claim 15 wherein:
the first data source identifies one of: 1) an object field; 2) an object property; and 3) an Extensible Markup Language document element.

19. The machine readable medium of claim 18 wherein:
an object is a JavaBean.

20. The machine readable medium of claim 15 wherein:
the first data source is one of: 1) an array; 2) a list; 3) a map.

21. The machine readable medium of claim 15 wherein:
the markup language can include at least one of: Hypertext Markup Language (HTML), Dynamic HTML, Extensible HTML, and Extensible Markup Language.

22. The machine readable medium of claim 15 wherein:
the first action can have at least one child action.

23. The machine readable medium of claim 22 wherein:
the at least one child action can refer to the first data source with a context defined by the first action.

24. The machine readable medium of claim 22 wherein:
the at least one child action can perform at least one of the following actions on the first data source: 1) set; 2) get; 3) sort; and 4) filter.

25. The machine readable medium of claim 22, further comprising instructions that when executed cause the system to:
render a list or a table based on the first data source.

26. The machine readable medium of claim 15 wherein the additional information includes an expression that is stored in the data source and wherein the expression is evaluated to produce a value when the additional information is rendered.

27. The machine readable medium of claim 15 wherein the data binding tag includes a repeater element wherein data associated with the repeater element is rendered multiple times according to the repeater element's lifecycle.

28. The machine readable medium of claim 27 wherein the repeater's lifecycle includes a plurality of states including an item state during which the repeater element determines, for each of the data associated with the repeater element, a user interface with which to render the data and permission to render the data in the user interface.

29. A system for dynamically binding a user interface to information, comprising:
   a computer including a computer readable medium and processor operating thereon;
   a user interface that is operable to
      display information in a webpage, wherein the information is stored in a business object,
      collect additional information from the user, and
      store the additional information within the business object;
   a plurality of data binding tags written in a first programming language stored on the computer readable medium wherein each data binding tag
      defines a rendering boundary within a web page for rendering the information and rules to be applied when the information is rendered,
      includes a lifecycle associated therewith,
      includes a plurality of attributes, and
      specifies an action to be performed on the business object wherein the action includes reading or updating information from the business object including the additional information;
   an expression language that can be used to evaluate expressions on specified business objects, wherein each expression specifies a business object in which the expression is to be evaluated; and
   a markup language that can be used to render the specified business objects on the web page in the user interface according to the render boundary and the rules defined by the data binding tag.

30. A system for dynamically binding a user interface to information stored in a data source, comprising:
   a web page that includes a plurality of data binding tags, wherein the data binding tags bind information stored in a data source on a business object to the web page;
   a user interface, wherein the user interface is operable to
      display the web page including the information that is stored in the data source on the business object,
      receive additional information from a user through fields in the web page, and
      store the additional information in the data source on the business object;
   wherein when the web page is displayed, the plurality of data binding tags are processed, which includes rendering the information stored in the data source that is referenced by each of the data binding tags, according to a rendering boundary defined by that data binding tag, and
      rules that define when the information is rendered for that tag, based on a current state of that tag; and
   wherein when the additional information is received from a user through a field in the web page, a data binding tag associated with that field is processed to perform an action specified by that data binding tag, wherein the action includes one or more of updating or reading from the data source referenced by the data binding tag.

31. The system of claim 30 wherein:
   each data binding tag references the data source using a script.

32. The system of claim 30 wherein:
   the data source identifies one of an object field, an object property, and an Extensible Markup Language document element.

33. The system of claim 30 wherein:
   the data source is one of an array, a list and a map.

34. The system of claim 30 wherein:
   the web page is rendered in one or more of Hypertext Markup Language (HTML), Dynamic HTML, Extensible HTML, and Extensible Markup Language.

35. The system of claim 30 wherein:
   the action can include a hierarchy of actions.

36. The system of claim 35 wherein:
   each action in the hierarchy of actions can refer to the data source with a context defined by that action.

37. The system of claim 35 wherein:
   each action in the hierarchy of actions can include one or more of set, get, sort, and filter.

38. The system of claim 30 wherein:
   a list or a table can be rendered in the web page based on the data source.

39. The framework of claim 30 wherein the additional information includes an expression that is stored in the data source and wherein the expression is evaluated to produce a value when the additional information is rendered.

40. The framework of claim 30 wherein each data binding tag can include a repeater element wherein data associated with the repeater element is rendered multiple times according to the repeater element's lifecycle.

41. The framework of claim 40 wherein the repeater's lifecycle includes a plurality of states including an item state during which the repeater element determines, for each of the data associated with the repeater element, a user interface with which to render the data and permission to render the data in the user interface.

* * * * *

UNITED STATES PATENT AND TRADEMARK OFFICE
CERTIFICATE OF CORRECTION

PATENT NO. : 7,650,276 B2  Page 1 of 1
APPLICATION NO. : 10/780300
DATED : January 19, 2010
INVENTOR(S) : Edward K. O'Neil et al.

It is certified that error appears in the above-identified patent and that said Letters Patent is hereby corrected as shown below:

In column 2, line 60, delete "obejct" and insert -- object --, therefor.

In column 4, line 59, delete "(actionForm.firstName)," and insert -- {actionForm.firstName}, --, therefor.

In column 5, line 66, delete "</:netui:label value" and insert -- <netui:label value --, therefor.

In column 6, line 32, delete "binding: repeater" and insert -- binding:repeater --, therefor.

In column 12, line 30, delete "will be," and insert -- will be --, therefor.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

PATENT NO.       : 7,650,276 B2
APPLICATION NO.  : 10/780300
DATED            : January 19, 2010
INVENTOR(S)      : O'Neil et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1512 days.

Signed and Sealed this

Twenty-third Day of November, 2010

David J. Kappos
*Director of the United States Patent and Trademark Office*